Sept. 4, 1962   J. KEENER   3,052,485
IMPACT GATE
Filed Sept. 21, 1959   2 Sheets-Sheet 2
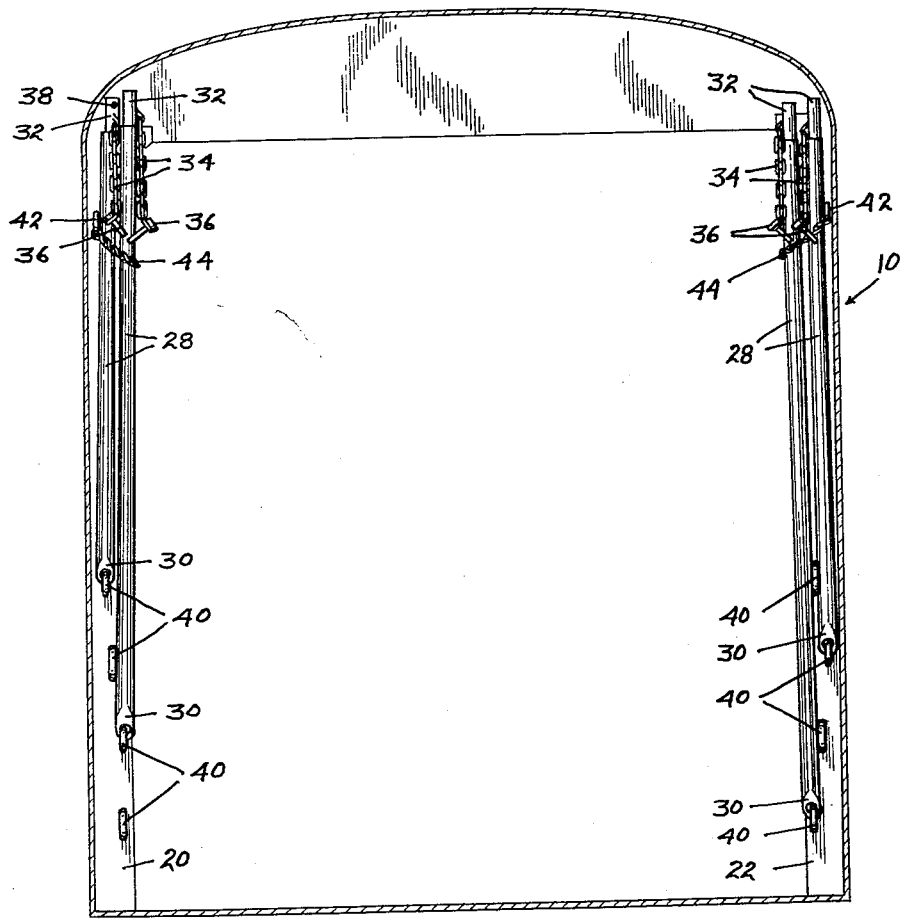
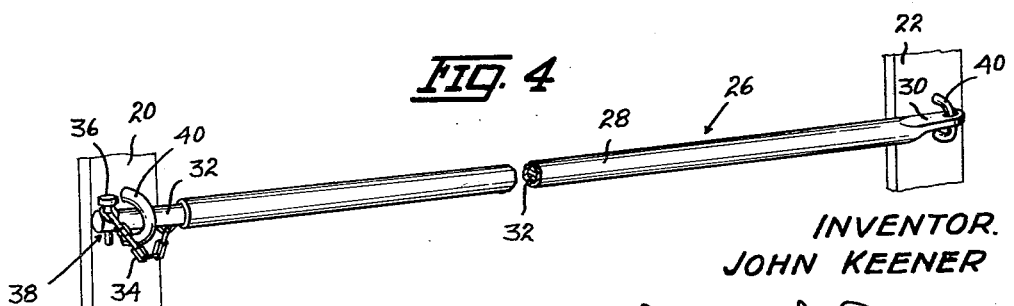
INVENTOR.
JOHN KEENER
BY Morton S. Adler
ATTORNEY.

Sept. 4, 1962
J. KEENER
3,052,485
IMPACT GATE
Filed Sept. 21, 1959
2 Sheets-Sheet 1
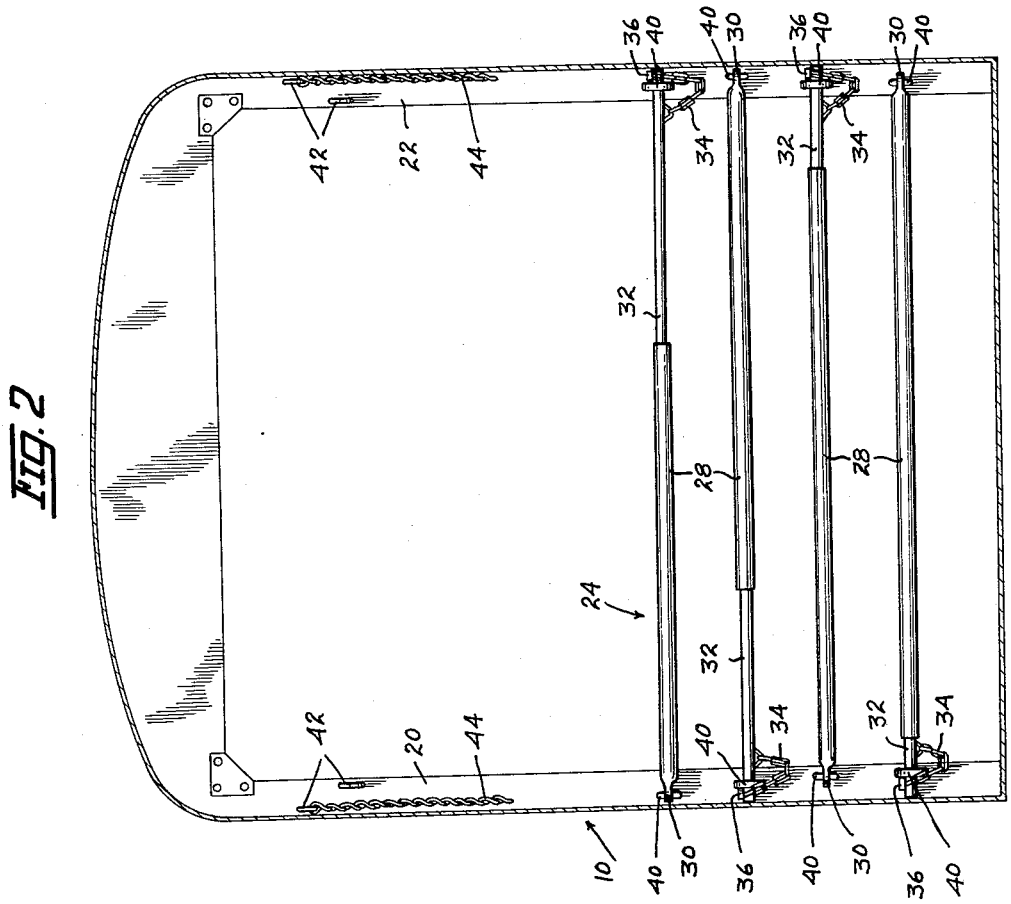
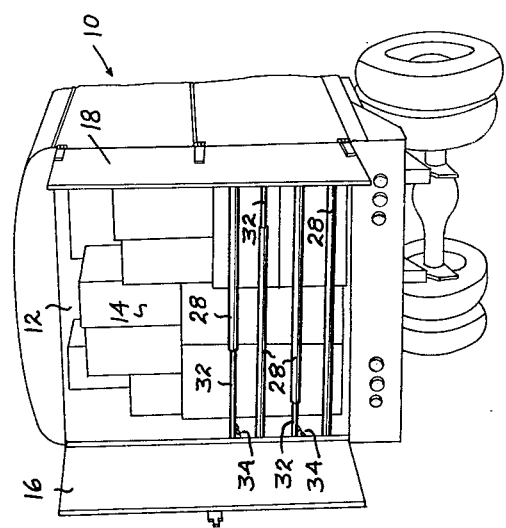
INVENTOR.
JOHN KEENER
BY Morton S. Adler
ATTORNEY.

United States Patent Office 3,052,485
Patented Sept. 4, 1962

3,052,485
IMPACT GATE
John Keener, Des Moines, Iowa, assignor of thirty-three and one-third percent each to George M. Clarkson and Gibson C. Holliday, both of Des Moines, Iowa
Filed Sept. 21, 1959, Ser. No. 841,289
3 Claims. (Cl. 280—179)

This invention relates to improvements in impact gates for truck and trailer cargo compartments and the like.

In the transporting of cargo in trucks and trailers, for example, there is sometimes a shifting or movement of the cargo under conditions of traveling and including starting and stopping, which results in the cargo or portions of it abutting against the rear doors on the cargo compartment so that damage to such doors is an important consideration. Particularly in the growing business of moving freight loaded trailers on piggyback railroad flat cars the possibility of damage to the trailer doors is such that trailers so transported are required to have some sort of impact gate device. For this purpose various arrangements of chains, drop bars and the like have been employed with varying degrees of success, but each have presented several disadvantages which I have overcome.

In this respect one of the important objects contemplated by this invention is the provision of an impact gate comprising a plurality of parts susceptible of arrangement into an efficient and sturdy impact gate and yet designed to be conveniently folded out of the way when not in use.

Another object is to provide an impact gate as characterized wherein the several parts making up the gate are suitably secured to the truck, trailer or the like so they cannot become lost or misplaced and are consequently always available for use when needed.

A further object inherent herein is the provision of an impact gate of the above class that is capable of adjustment for use on different sized cargo carriers.

Still another object is to provide an impact gate as indicated that may be constructed so as to be progressively stronger from top to bottom.

Further objects and the more obvious advantages of the invention will be mentioned or else appear plainly from the description which follows.

This invention consists of novel parts and combination of parts to be hereinafter described whereby the objects set forth are attained, as pointed out in the claims, and illustrated in the accompanying drawings, in which:

FIG. 1 is a fragmentary perspective view showing the rearward portion of cargo compartment on a truck, trailer or the like and illustrating a preferred embodiment of my new impact gate in operating position, FIG. 2 is an enlarged elevational view of the rear of the cargo carrier as seen from the interior of the cargo compartment with the impact gate in operable position, FIG. 3 is a view similar to FIG. 2, but showing the gate folded and latched in nonoperable position, and FIG. 4 is an enlarged perspective view of one of the component barriers forming a part of this gate.

Referring to the drawings the cargo carrying body portion of a truck, semitrailer or the like is designated by the numeral 10 and provides the enclosed cargo compartment 12 for the cargo as shown at 14. Access to compartment 12 from the rear of body 10 is generally provided by latchable hinged doors 16 and 18 in a well known manner and this invention is designed to provide an efficient impact gate to protect doors 16 and 18 from being accidently opened or damaged by shifting and movement of the cargo 14 during transit. Body 10 by its structure, includes at the rear the inwardly extending wall frame portions or supports 20 and 22 which carry the doors 16 and 18 and define the rear body opening and I have utilized these frame portions of body 10 in mounting my gate which I shall now describe.

This gate, designated generally by the numeral 24, comprises a plurality of movable and adjustable barrier members 26 of the type illustrated in FIG. 4 which are designed in their operable position to be horizontally disposed in vertically spaced parallel relationship across the lower portion of the rear opening in the cargo compartment 12 defined by members 20 and 22 so as to be intermediate doors 16 and 18 and the cargo 14. Each barrier 26 includes an elongated rigid tubular pipe or member 28 having an integral apertured ear 30 on one and and an elongated rigid bar member 32 telescopically arranged within member 28. Bar members 32 are preferably made of sufficient length to always be in penetration of member 28 for the major proportion of its lengths for purpose of greater strength. The outer end portion of each bar member 32 carries a chain 34 for securing a pin 36 for use in a transverse hole 38 near the outer end of each bar 32 as will later appear.

On each body member 20 and 22 and on the inner side and lower portion thereof relative to compartment 12, I have secured a plurality of vertically spaced eye members 40. Also on each member 20 and 22 I have attached a pair of spaced eye members or hooks 42 near the upper end thereof above the eye members 40 and to one of the members 42 on each member 20 and 22 there is secured one end of a length of chain 44. Each eye member 40 is oppositely disposed to a like eye member and to alternate eye members 40 on each body portion 20 and 22 the ear 30 of one of the barriers 26 is pivotally attached. This is illustrated in FIGS. 1–3 where I have used four barriers 26 although it will be understood that the number of barriers employed may be varied according to the height of the rear opening in the cargo compartment.

The outer or free end of each bar 32, being extensible from and retractable in barrier tube 28 is passed through the eye member 40 horizontally oppositely disposed to the eye member 40 to which its respective tubular portion 30 is pivotally attached. Pin 36 is then inserted through opening 38 to prevent the accidental withdrawal of bar 32 from eye 40 and it will be appreciated that the sidewalls of body 10 will act as a stop means to keep bar 32 from sliding out of tube 28. Thus arranged it will be seen that barriers 26 form a most satisfactory and efficient impact gate for its intended purposes.

For loading and unloading compartment 12 or when a gate 24 is not required, pins 36 are removed, bars 32 withdraw from eye members 40 and the barriers 26 are pivotally moved on their respective ears 30 so that all bars attached to respective ears 40 at respective sides of the cargo compartment are vertically positioned against the respective supports 20 and 22 and lashed to such supports by chains 44 as shown in FIG. 3. For this purpose the respective chains 44 are passed around all barriers on the respective sides and fastened to one of the eye members 42. Theis effectively holds the barriers 26 out of the way and provides a convenient storage place where they are available at all times. The barriers 26 are sturdy enough so as not to be susceptible to breaking as often occurs with chains, drop bars and the like and when handled as described will not get lost or misplaced.

Since the greater resistance force of the gate is usually required near the bottom, it will be noted in FIGS. 1 and 2 that the length of tubes 28 are progressively longer from top to bottom. This gives greater strength where it is needed and permits an economy in the manufacture of the several sections. Such variance in length of members 28, however, is not required and they may be all of like size, if desired. It will also be appreciated that the deep penetration of rods 32 into the tubular members 28 affords ample adjustment for cargo compartments of different widths and reduces the possibility of any bar 32 becoming removed from its tube 28 when being moved to or from its operable or inoperable position as described.

It will be understood that the phraseology employed herein is for the purpose of description and not for limitation and that modifications and changes in the construction and arrangement of this invention can be made within the scope of what is claimed, without departing from the spirit and purpose thereof. It is thus intended to cover by the claims, any modified forms of structure or mechanical equivalents which may be reasonably included within their scope.

I claim:

1. An impact gate comprising a plurality of longitudinally extensible barrier members adapted in operable position to be horizontally disposed in vertically spaced parallel relationship across an opening to be protected, a first support at one side of the opening, a second support at the other side thereof, corresponding ends of alternate barrier members pivotally secured to said first support with the opposite ends of said barrier members removably secured to said second support, corresponding ends of the intermediate alternate barrier members pivotally secured to said second support with the opposite ends of said barrier members removably secured to said first support, said barrier members each movable on their respective pivotal connection to a respective support to a vertical inoperable position so as to leave the opening unobstructed, and respective means on each support for removably securing the free ends of said barrier members in their inoperable position to said respective supports.

2. In an impact gate, a plurality of barriers each comprising a rigid tubular member and a rigid rod telescopically disposed therein, said barriers adapted in their operable position to be horizontally disposed in vertically spaced parallel relationship across an opening to be protected, a support at each side of the opening, each tubular member pivotally attached at its free end to one of said supports, the free end of each rod extensible to and removably attached to the other support, and said tubular members on respective barriers being progressively longer from top to bottom to progressively increase the length of telescopic relationship of said rods and tubular members and thereby make said gate increasingly stronger toward its lower portion.

3. An impact gate for the cargo carrying compartment of a truck, trailer or the like, said compartment including frame means defining an opening for receiving and discharging cargo, and a closure for said opening, said gate comprising a plurality of longitudinally extensible barrier members adapted in operable position to be horizontally disposed in vertically spaced parallel relationship across said opening and closely adjacent the closure therefor, each barrier member pivotally attached at one end directly to said frame means at one side of the opening and removably attached at the other end directly to said frame means at the other side of the opening, alternate barrier members being pivotally attached at one side of the opening and the intermediate alternate barrier members being pivotally attached at the other side of the opening, each barrier member movable on its pivotal connection to a vertical inoperable position to leave the opening unobstructed, and means on each side of the opening on said frame means to removably secure said barrier members in inoperable position.

References Cited in the file of this patent

UNITED STATES PATENTS

| | | |
|---|---|---|
| 367,367 | Cooper | Aug. 2, 1887 |
| 1,064,130 | Conlin | June 10, 1913 |
| 1,931,391 | Olefsky et al. | Oct. 17, 1933 |
| 2,543,175 | Kilgore | Feb. 27, 1951 |
| 2,608,420 | Eck | Aug. 26, 1952 |
| 2,712,797 | Woehrle et al. | July 21, 1955 |
| 2,961,271 | Morris | Nov. 22, 1960 |